March 24, 1970     H. J. MARSCHAK     3,502,226

DISPLAY STAND

Filed May 29, 1968     2 Sheets-Sheet 1

INVENTOR
Howard J. Marschak
by Max R. Kraus
Att'y

March 24, 1970     H. J. MARSCHAK     3,502,226
DISPLAY STAND
Filed May 29, 1968

United States Patent Office 3,502,226
Patented Mar. 24, 1970

3,502,226
DISPLAY STAND
Howard J. Marschak, Evanston, Ill.
(855 W. North Ave., Chicago, Ill. 60622)
Filed May 29, 1968, Ser. No. 733,137
Int. Cl. A47f 5/02, 5/04
U.S. Cl. 211—163
3 Claims

ABSTRACT OF THE DISCLOSURE

A display stand formed of components which may be boxed and shipped disassembled to occupy a minimum amount of space but which can be readily set up and put together, and in which the stand has a rotatable center hub to which are detachably secured and locked in position a plurality of panels which serve to support and display merchandise, and in which the panels are arranged to provide the maximum display surface in a minimized area.

BRIEF SUMMARY

One of the objects of this invention is to provide a display stand which may be packaged and shipped in a knocked-down condition and which may be readily set up, and in which the display panels are arranged to provide the maximum display surface in a minimized or reduced area, and in which the display panels may be rotated relative to the stand.

Another object of this invention is to provide a display stand aforedescribed provided with a rotatable center hub on which are readily mounted a plurality of display panels, such as apertured panels, and in which the panels are mounted on the hub at right angles to adjacent panels, with the inner ends of the panels positioned intermediate to the opposite ends of the adjacent panel and perpendicular to said adjacent to enclose the center hub and provide the maximum display surface area for each panel, and providing an attractive display. The panels form a center box-like core, and each panel tends to brace and strengthen the adjoining panels.

Other objects will become apaprent as this description progresses.

Figure 1:
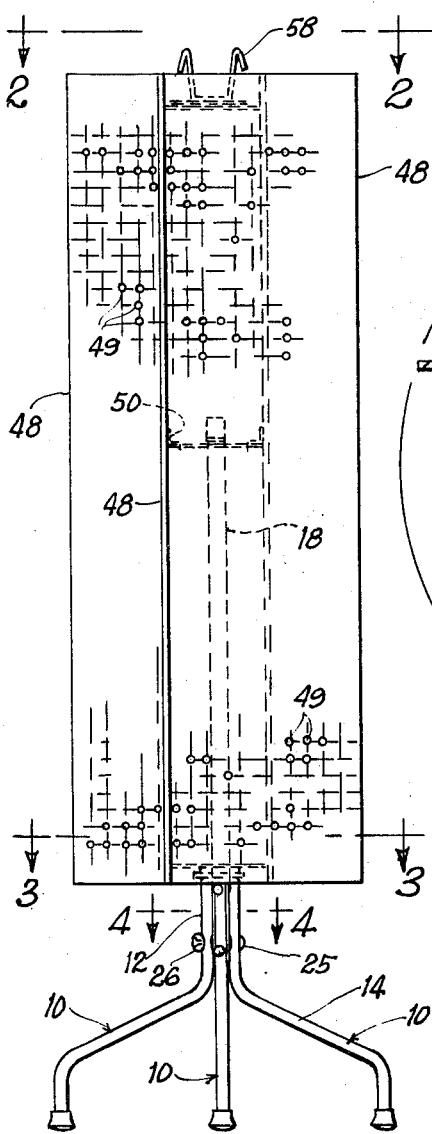
FIG. 1 is an elevational view of the display stand forming this invention.

The display unit of this invention is formed of parts or components which in the main are assembled at the place where the display is to be set up. The parts, except for the apertured panels, are formed preferably of metal. The unit, except for the center rotatable hub, is shipped in a knocked-down or disassembled condition. The parts forming the center rotatable hub is preferably formed as an assembled integral unit but its size is of such character as not to interfere with the overall dimensions of the remaining components, therefore, the entire unit may be packaged in a knocked-down condition in a minimum of space.

The unit includes four legs, all of identical construction, and generally designated by the numeral 10. The legs are each formed preferably of tubular stock and are shaped to form an upper vertical section 12 which continues downwardly at an inclined angle to form an inclined section 14 and then terminates in a lower generally vertical extending section 16. The legs are each provided with a pair of spaced transversely extending openings 17. The legs are adapted to be secured to a center hub pole, made preferably of tubular stock, and designated by the numeral 18.

The lower end of the pole 18 is provided with four equi-distinct spaced pairs of openings designated by the numerals 20, 21, 22 and 23. The pair of openings 20 and 22 are diametrically opposite and are in horizontal alinement. The pair of openings 21 and 23 are also diametrically opposite and are in horizontal alinement. The pairs of openings 20 and 22 are on different planes than the openings 21 and 23 so that the four legs may be readily secured to the pole and spaced 90° apart.

Figure 6:
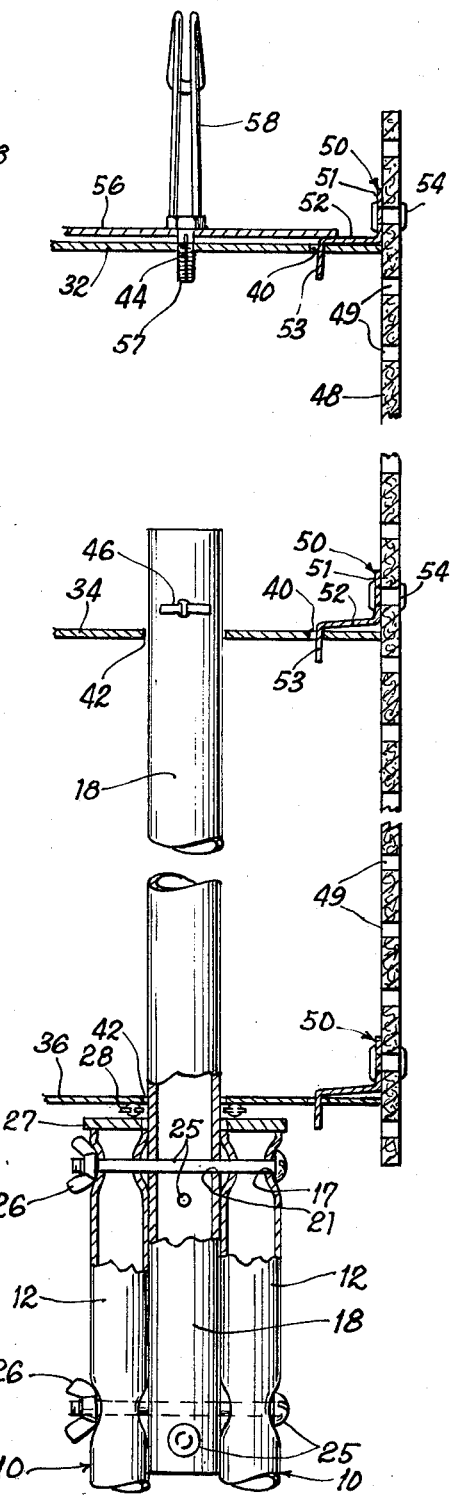
FIG. 6 is an enlarged view of certain of the parts forming the stand.

The legs 10 are secured to the center hub pole 18 by conventional fastening bolts 25 and wing nuts 26. Each bolt connects two diametrically oppositely positioned legs, as best seen in FIG. 6, by passing through the respective openings in the legs and pole. An enlarged washer or ring 27 and a bearing ring 28 are positioned on the center hub pole 18. These are inserted on the pole through the lower end of the pole before the legs are attached to the center hub pole. When the legs are attached to the center hub pole the washer 27 will rest on the top of the legs 10 and the bearing ring 28 will rest on the washer 27. The bearing ring 28 is of conventional construction and comprises a ring provided with the usual ball bearings.

The rotatable center hub member, generally indicated by the numeral 30, is an assembly of parts which are permanently joined together to form an integral unit and comprises a framework-like structure consisting of three horizontally positioned plates 32, 34 and 36, generally of identical construction, which are held together by four spaced vertically extending rods 38. The plates 32, 34 and 36 are of generally square shape in plan and are each provided with four slots all designated by the numeral 40. Each slot is spaced inwardly from the edge of the plate and is parallel thereto. The plates 32, 34 and 36 are connected together by means of the four rods 38 which are brazed to the plates. As shown, the plates are spaced from each other and plate 32 is the top plate, plate 34 is the intermediate plate, and plate 36 is the bottom plate. The plates are provided along their edges with recesses to accommodate the rods, in which position the rods are thus brazed to said plates. The rotatable center hub member or assembly 30 therefore comprises an integral unit and is thus packaged with the remaining components.

The intermediate and bottom plates 34 and 36 are each provided with a central opening 42 so that the center hub assembly 30 can be positioned on the center hub pole 18. When so positioned the bottom plate 36 will rest on the bearing ring 28 which will therefore permit the center hub assembly 30 to be readily rotated about the center hub pole 18 when desired. The top plate 32 of the center hub assembly is provided with a central internally threaded opening 44 to accommodate a screw or other fastening member, to be subsequently described. After the center hub assembly 30 is supported on the center hub pole 18 a cotter pin 46 or the like is passed through the alined openings at the upper end of the center hub pole to prevent the hub assembly from accidentally being lifted upwardly above the center hub pole.

Figure 5:
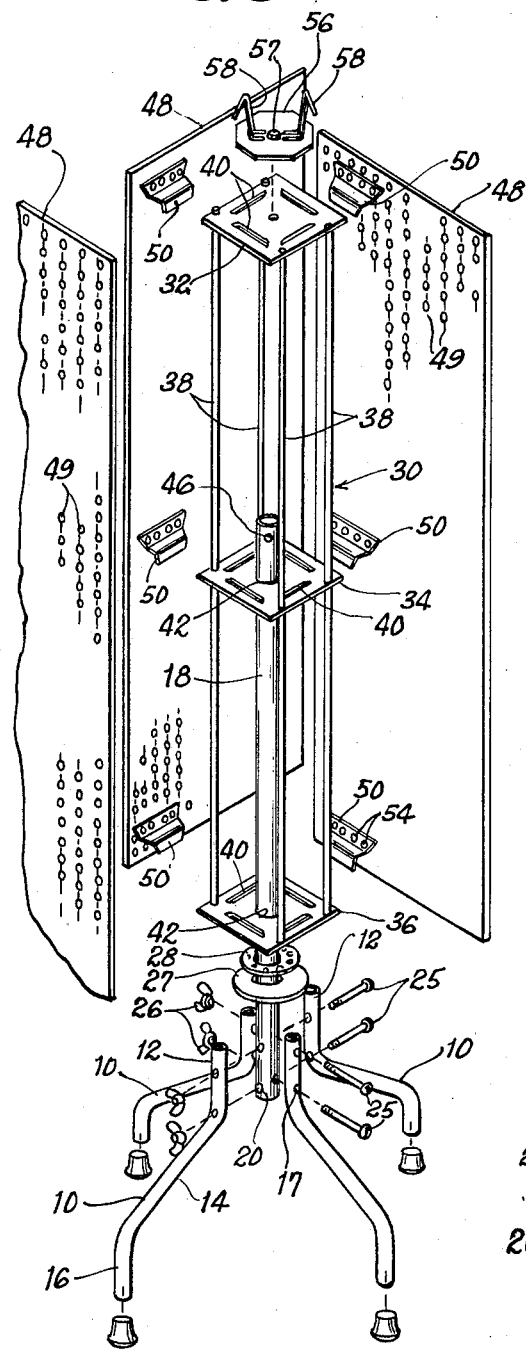
FIG. 5 is an exploded perspective view of the part forming the stand.

The display panels as herein shown are apertured panels, generally indicated by the numeral 48, and four such apertured panels are used in connection with the display unit. The panels have been additionally identified by the letters A, B, C and D. The apertured panels are of the same size and shape, having a generally rectangular configuration, and are provided with spaced openings 49 throughout, as is conventional. Each of the panels has secured to the inside surface thereof, adjacent one of the sides thereof, three spaced brackets generally designated by the numeral 50. The brackets each have an upper vertical portion 51, a horizontal portion 52 and a downwardly depending flange or lip 53. The brackets are secured to the panels along the upper portion thereof by rivets or other suitable fastening means 54 and when thus secured the brackets form a permanent part of the panel 48. As can be seen in FIGS. 5 and 6, the brackets 50 are positioned on the panel in vertical alinement and are spaced to conform to the spacing distance between the three horizontal plates 32, 34 and 36 of the center hub assembly 30.

Figure 3:
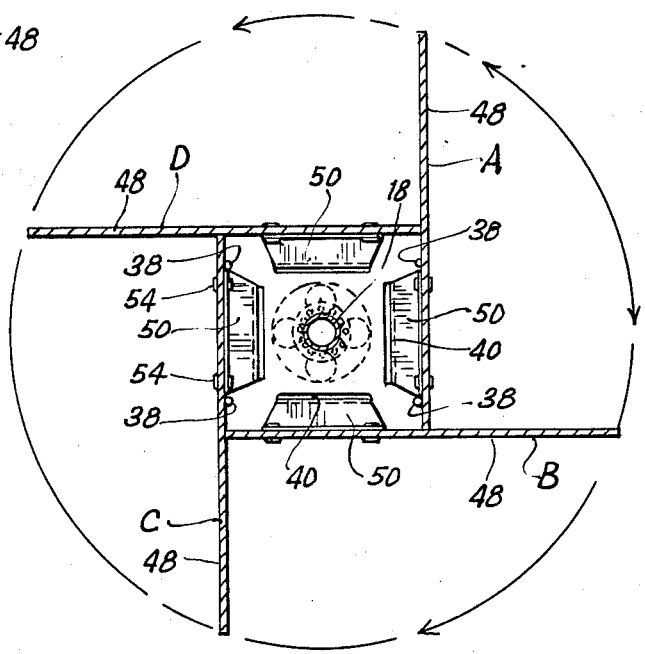
FIG. 3 is a view taken on line 3—3 of FIG. 1.
Figure 4:
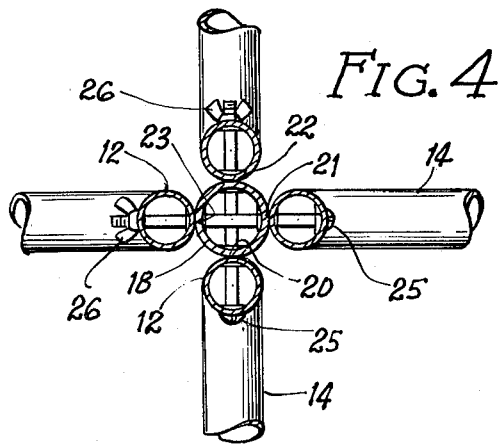
FIG. 4 is a view taken on line 4—4 of FIG. 1.
Figure 2:
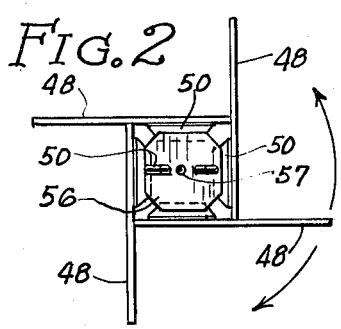
FIG. 2 is a top plan view (reduced) taken on line 2—2 of FIG. 1.

The panels 48 are detachably secured by means of the brackets 50 to the horizontal plates 32, 34 and 36 of the center hub assembly by inserting the depending lip or flange 53 of each bracket in its respective slot 40 in the horizontal plates, with the horizontal portion 52 of the bracket resting on the plate. This will hold the panels to the center hub assembly, with the panels supported on said plates. By positioning the brackets adjacent one of the edges of each of the panels, the panels are mounted on the center hub assembly in the arrangement shown in FIGS. 2 and 3. For example, the inner edge of panel A will be positioned inwardly of the outer edge of panel B. The inner edge of panel B will be positioned inwardly of the outer edge of panel C. The inner edge of panel C will be positioned inwardly of the outer edge of panel D. The inner edge of panel D will be positioned inwardly of the outer edge of panel A. This arrangement provides a very distinctive panel arrangement in which the panels are positioned at right angles to adjacent panels and intersect the adjacent panels. As best seen in FIG. 3, a central square-shaped or center box-like core configuration is formed by said panels with a portion of each panel extending outwardly of the central square-shaped configuration or core to provide a maximum display area to which articles of merchandise may be attached to the apertured panels. This also permits the arrangement of the display panels in a compact manner around the center hub assembly without spreading the panels away from the center hub assembly, such as, for example, where the panels would be positioned edge to edge to form a square-shaped configuration in plan, which could obviously be done by centering the brackets on each of the panels and providing brackets of a length to be accommodated in the slots.

To lock the panels in position against accidental displacement or unauthorized removal a locking plate 56, preferably of octagonal shape is provided with a screw 57 secured thereto. The locking plate 56 has secured to it upstanding spaced wire members 58 which may accommodate a sign or the like. The locking plate 56 is secured to the top plate 32 of the center hub assembly, as shown in FIG. 6, by means of the screw 57 which engages the internally threaded opening 44. The locking plate 56 will engage the horizontal portions 52 of each of the upper brackets on each of the panels to lock the panels against accidental or unauthorized removal. The plate 56 may be round if desired to engage the horizontal portions of the upper brackets. However, should it be desired to remove the panels the fastening member 60 is unthreaded and the locking plate 56 is removed.

What is claimed is:

1. A display stand comprising a base, an upright supported on said base, a center hub member supported on said upright and capable of being rotated with respect to said upright, said center hub member being a framework comprising a plurality of spaced horizontally positioned plates connected by a plurality of rods, said plates having slots, a plurality of display panels, each of said panels having a plurality of brackets positioned in vertical alinement but adjacent one of the sides of the panel to engage the slots in the plates for attachment of said panels to the center hub member.

2. A display stand as set forth in claim 1 in which the inner end of each of the panels intersects the adjacent panel to form a central square-shaped configuration surrounding the center hub member, with a portion of each panel extending outwardly of the center square-shaped configuration.

3. A display stand as set forth in claim 1 in which a locking plate is secured to the top horizontal plate of the center hub member to engage the attachment means on the panels to lock the panels against removal.

References Cited

UNITED STATES PATENTS

| | | | |
|---|---|---|---|
| 185,384 | 12/1876 | Bisel | 211—144 |
| 1,751,505 | 3/1930 | Borland | 211—163 |
| 2,738,075 | 3/1956 | Guignard et al. | 211—56 |
| 3,092,258 | 6/1963 | Bleed | 211—163 |
| 3,223,247 | 12/1965 | Bleed | 211—163 |

FOREIGN PATENTS

| | | |
|---|---|---|
| 825,910 | 12/1959 | Great Britain. |
| 932,166 | 7/1963 | Great Britain. |

MARION PARSONS, JR., Primary Examiner